March 11, 1941.  R. H. FLEET ET AL  2,234,750
LAUNCHING AIRPLANES FROM WATER
Original Filed Jan. 13, 1937  3 Sheets-Sheet 1
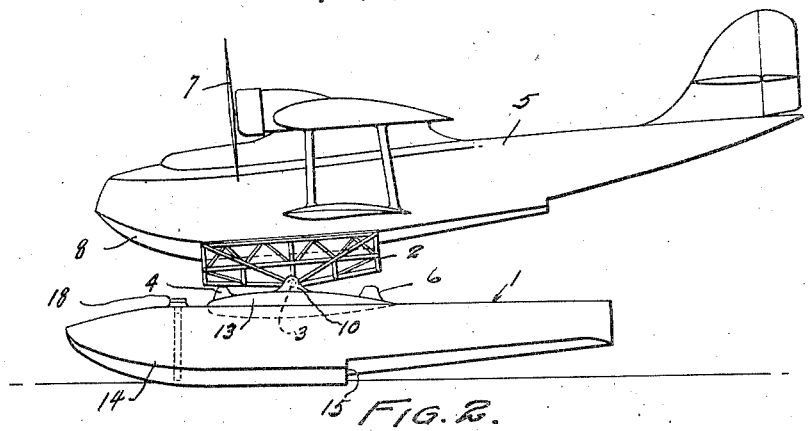
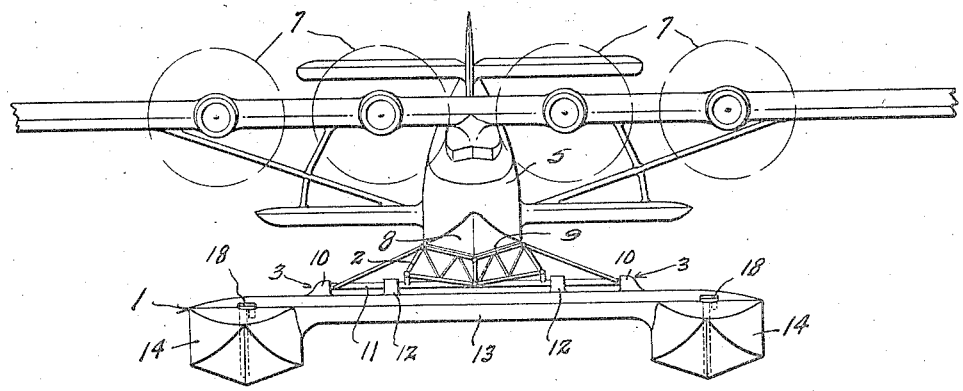
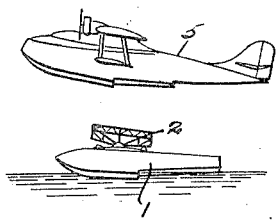
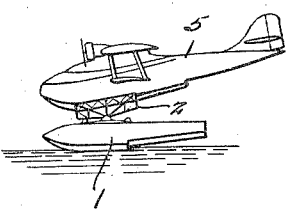
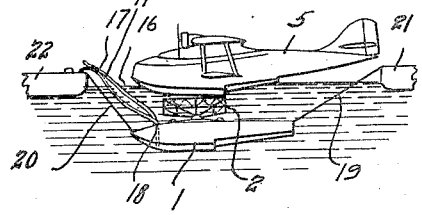
Inventors
REUBEN H FLEET
ISAAC M. LADDON
AND WILLIAM B. WHEATLEY
By Semmes & Semmes
Attorneys March 11, 1941. R. H. FLEET ET AL 2,234,750
LAUNCHING AIRPLANES FROM WATER
Original Filed Jan. 13, 1937   3 Sheets-Sheet 2

Inventors
REUBEN H. FLEET
ISAAC M. LADDON
AND WILLIAM B. WHEATLEY
By Semmes & Semmes
Attorneys

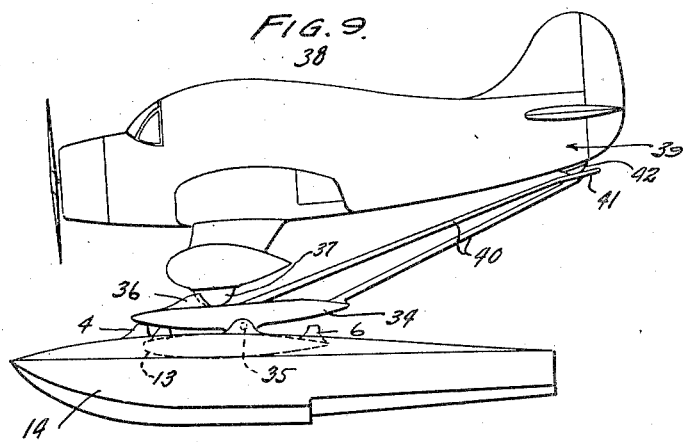
FIG. 9.
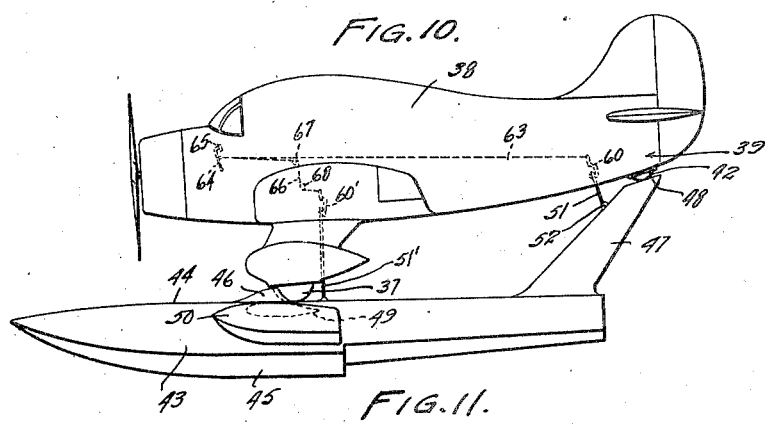
FIG. 10.
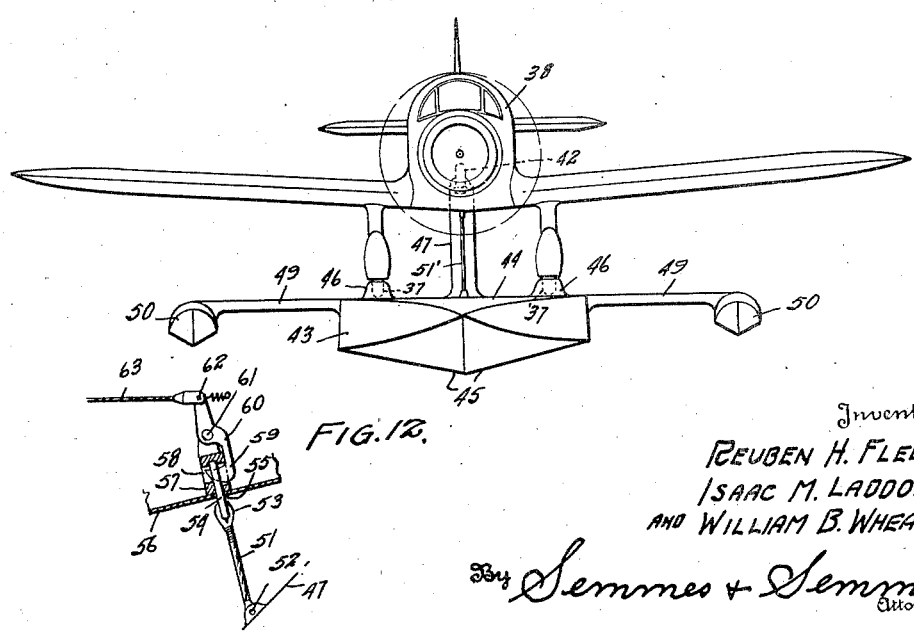
FIG. 11.
FIG. 12.
Inventors
REUBEN H. FLEET,
ISAAC M. LADDON
AND WILLIAM B. WHEATLEY
By Semmes & Semmes
Attorneys Patented Mar. 11, 1941

2,234,750

UNITED STATES PATENT OFFICE 2,234,750

LAUNCHING AIRPLANES FROM WATER

Reuben H. Fleet, William B. Wheatley, and Isaac M. Laddon, San Diego, Calif.

Application January 13, 1937, Serial No. 120,440
Renewed April 16, 1940

10 Claims. (Cl. 244—63)

Our invention relates to means for launching an airplane.

The method we employ is to mount the airplane on a boat hull, from which the airplane takes off leaving the boat hull in the water. The airplane may be of the landplane or seaplane type, and is adapted to merely rest on the supporting boat hull or to be locked to the hull until the pilot releases it.

One of the advantages of the invention lies in the lightening of the structure of the airplane, thus permitting a greater load carrying capacity. This is particularly true of seaplanes where the boat hull, in the case of a flying boat, or the pontoons comprise a substantial portion of the weight. Where there is a small available landing field near water, landplanes can be landed on the air field and then launched from a detachable boat hull which will be propelled across the water. Thus landplanes can be used in localities where the landing field would not be big enough for a proper takeoff.

There are a number of other advantages of our type of construction which will be apparent from the ensuing description. Among these advantages are that the pontoons, or supporting boat hull, can be designed for the most favorable water characteristics without adapting the design for reduced air resistance, such as is necessary at the present time where the pontoons or boat hull are carried into the air with the airplane. The pontoons, or boat hull, can be given a large area so that the draft of the pontoon or boat hull will not be as great as at present necessary in view of the compromise which is now being made between favorable water characteristics and favorable air resistance. Features such as reduced water resistance for a given amount of water displaced, etc. can be incorporated in the design of the supporting boat hull or pontoon structure.

Moreover our system has the advantage of being able to vary the attitude of the airplane without changing the planing angle of the pontoons or supporting boat hull.

One type of our invention contemplates locking the airplane to the boat hull, or pontoons, and in this type of construction by manipulating the controls on the airplane the boat hull or pontoons can be rocked to cause it to "get on the step."

In order to make our invention more clearly understood, we have shown in the accompanying drawings means for carrying the same into practical effect without limiting the improvements in their useful applications to the particular constructions which, for the purpose of explanation, have been made the subject of illustration.

In the drawings:

Figure 1 is a view in side elevation of a flying boat mounted on our boat hull which is also shown in side elevation;

Fig. 2 is a view in front elevation of the construction shown in Figure 1;

Fig. 3 is a diagrammatic side elevation of a flying boat being mounted on a submerged boat hull;

Fig. 4 is a diagrammatic view showing the boat hull raised into floating position and supporting the flying boat out of the water, the flying boat being in a relatively low-lift attitude;

Fig. 5 is a diagrammatic view showing the positions of the detachable boat hull and flying boat after the airplane has taken off from the supporting boat hull;

Fig. 9 is a view in side elevation of a form of supporting boat hull for use with landplanes;

Fig. 10 is a view in side elevation of a form of device in which the airplane is locked to the boat hull until the instant of takeoff;

Fig. 11 is a front elevational view of the form of device shown in Figure 10;

Fig. 12 is a detail view showing the locking mechanism for locking the airplane to the boat hull in the form of device illustrated in Figure 10.

Figure 6:
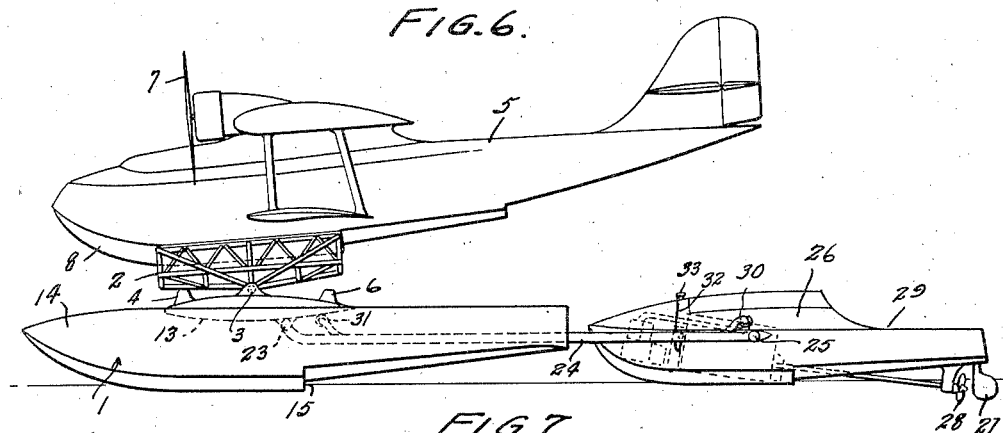
Fig. 6 is a view in side elevation of another form of our invention showing the supporting boat and the propelling boat hull flexibly attached thereto.

Referring to the drawings, we have shown in Figures 1 and 2 a supporting boat hull 1 carrying a cradle 2 pivoted at 3 on the boat hull. The pivoted cradle 2 is adapted to contact a front support element 4 in a relatively low angle of attack attitude of a seaplane 5 mounted on the cradle 2, and a rear support 6 in a relatively high angle of attack attitude of the seaplane 5.

The seaplane 5 is provided with propellers 7, and a V-bottom undersurface 8 which lies on the upper surface of the cradle 2, which is given a V-shape, as indicated at 9, to accommodate the V-bottom 8 of the flying boat. The cradle, as above stated, is pivoted at 3 on end supports 10 in which the ends of a shaft 11 are journaled. There are intermediate supporting journals 12 provided.

The supports 10 and the supports 12 lie on the upper surface of a support platform 13 which is supported between two pontoons 14. Each pontoon 14 may be provided with a bottom having a step 15 therein, in accordance with the usual practice for construction of pontoons. The supports 4 and 6, and those above mentioned, are located on the platform 13.

At a seaplane base where a hoist is available, the flying boat may be hoisted and placed on the supporting hull, thus eliminating the necessity of sinking the supporting hull.

In another operation the flying boat 5 may be resting on the surface 16 of the water. The supporting hull 1 is allowed to fill with water which may be pumped into each of the pontoons through lines 17 which are flexible and adapted to have their ends, through a suitable coupling not shown in detail, coupled to couplings 18 shown in Figure 2 at the top of each pontoon 14. Through the admission of water through the lines 17 into the pontoons 14, the pontoons 14 sink below the surface and are held in place by lines 19 at the stern and 20 at the bow. The lines 19 may be attached to an anchored float or body 21, and the lines 20 to an anchored float or body 22. Or 21 and 22 may indicate tenders which may be employed to maneuver the boat hull under the airplane.

When the supporting hull 1 is below the water as shown in Fig. 3, the flying boat 5 may be maneuvered to a position above the cradle 2, or the supporting hull in the case of tenders being used can be so maneuvered as to bring the flying boat and the supporting boat hull in the proper relative position. Through the lines 17 water may be pumped out of the pontoons 14 and the supporting hull raised to the position indicated diagrammatically in Figure 4, wherein the hull is shown floating high.

It is to be understood that where water is pumped into or out of the pontoons 14 provision must be made for the discharge or inflow of air. We have shown air lines 17' that are attached to the coupling 18 and permit air to flow into or be discharged from the pontoons 14. Note that the lines 17 are indicated as reaching to the bottom of the pontoons 14, so that the pontoons may be substantially completely pumped dry. Instead of the method above set forth air could of course be pumped into the pontoons to displace water in raising the pontoons. The details of this later method will be readily apparent and it is not thought necessary to illustrate them.

The seaplane 5 in Figure 4 is shown in a relatively low-lift attitude. The motors are started and the propellers 7 drive the combined seaplane and supporting hull forward until a speed which is preferably well in excess of flying speed is attained, at which time the pilot operates the controls to rotate the seaplane into the position where the cradle 2 contacts the rear support 6. The flying boat, since it is in a relatively high angle of attack attitude, then rises into the air as indicated in Figure 5.

Figure 7:
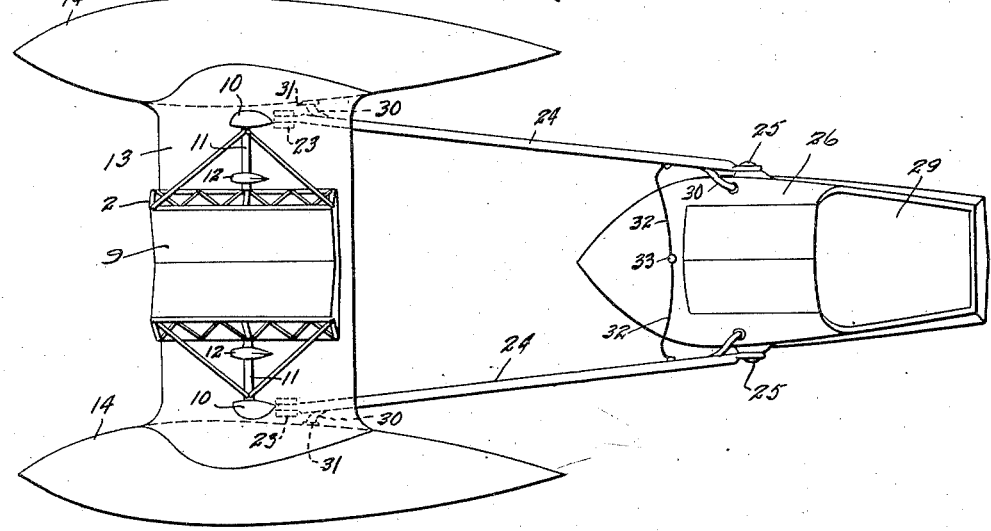
Fig. 7 is a top plan view of the form of invention shown in Figure 6, with the airplane removed from the cradle on the supporting boat hull.
Figure 8:
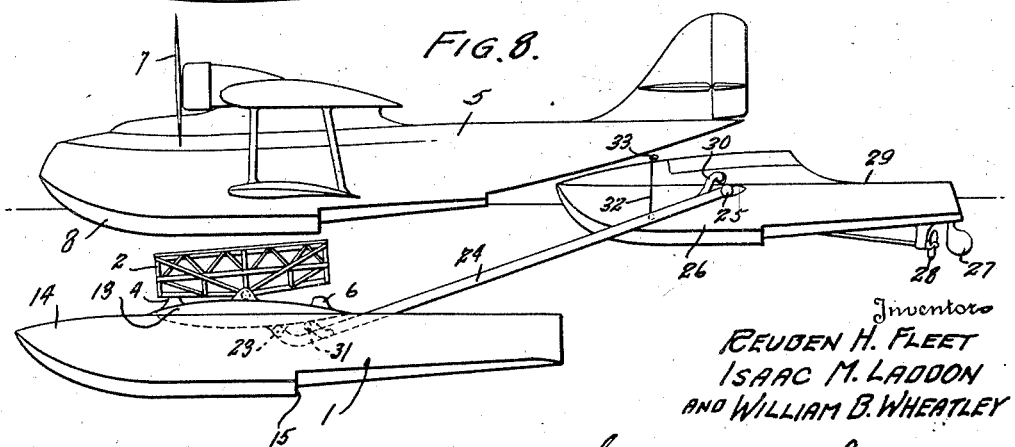
Fig. 8 is a view in side elevation showing the position of the flying boat and the supporting boat hull just before the flying boat contacts the supporting cradle.

In Figures 6, 7 and 8 we have shown another type of our invention in which the supporting hull 1 has pivoted to the undersurface of the platform 13 at points 23 connecting link elements 24 which are pivoted at 25 to a propelling boat member 26 which is provided with a motor, not shown, a rudder 27 and propeller 28, and in the cockpit 29 of which is adapted to ride a pilot.

From a suitable pump provided in the interior of the propelling boat 26 lead flexible pipe lines 30 which are suitably attached at 31 to each of the pontoons 14. Suitable connections are made from near the bottom of the pontoons 14 to the flexible pipes 31, thus enabling water to be pumped out of the pontoons or pumped into them at will to raise or to lower the supporting hull 1.

The connecting pipes within the interior of the pontoons are not shown, for purposes of simplicity in illustration, nor are they shown in Figures 1 and 2, though it is to be understood that suitable pipe connections will be made to permit water to be pumped out of the pontoons or into the pontoons at will.

In order to prevent the arms 24 from falling too low and permitting the supporting hull to sink too far below the surface of the water, we have shown flexible cables 32 attached to an upright 33 on top of the propelling boat 26. As shown in Figure 8, the cables 32 will be stretched taut and support the arms 24 from falling too low. The length of the cables 32 may be adjusted to permit the boat hull 1 to sink to a proper depth below the surface.

In the operation of this type of device the motors of the airplane, as well as the propelling motor of the boat 26, drive the airplane and the supporting hull forward until a speed well in excess of the flying speed of the airplane is reached, at which time the pilot operates the controls to raise the airplane from the supporting cradle. As explained previously in connection with the form of device shown in Figures 1 to 5 inclusive, the supporting hull may be raised or lowered by pumping water into or pumping water out of the pontoons.

In Figure 9 we have shown a type of construction in which there is mounted on the platform 13 between the pontoons 14 another type of pivoted cradle 34, which is pivoted on supports 35 formed on the platform 13. This form of cradle 34 is provided with front chocks 36 against which the wheels 37 of the landplane 38 are adapted to lie, as indicated. The rear of the landplane indicated generally by the numeral 39 is supported by means of outrigger elements 40 which are attached to the upper surface of the pivoted support or cradle 34. The outrigger elements join in a supporting surface 41 against which rests the rear wheel or skid 42 of the landplane 38. In this form of device the pilot maintains the airplane in a low-lift attitude, as shown in Figure 9, until the proper speed is reached. On rotating the airplane until the cradle 34 contacts the rear support element 6 the airplane will take to the air, the wheels 37 being lifted out of contact with the chocks 36. This type of cradle support is of particular use as indicated, with landplanes, which ordinarily require tail support elements in view of the fact that the wheels only of the landplane rest against the cradle proper, thus making it necessary to have the tail supported.

In the form of device shown in Figures 10 to 12, inclusive, we have shown the same landplane 38 illustrated in Figure 9 supported on a single boat hull 43 having an upper support surface 44 and a bottom 45. The wheels 37 rest against chocks 46 formed on the upper surface 44 of the single boat hull 43. The single boat hull 43 is provided with an upwardly projecting support member 47 having an upper supporting surface 48 against which the rear wheel or skid 42 of the landplane 38 rests. The boat hull 43 is provided with outriggers 49 carrying small outrigger pontoons 50 to give lateral stability to the combination.

In order to hold the landplane 38 firmly in position on top of the boat hull 43, we have shown a holding mechanism comprising a cable 51 pivoted at 52 on the support 47. The cable is provided with an eye 53 in which is attached a link 54. The link 54 passes through an aperture 55 formed in the bottom 56 of the landplane 38. Attached to the inside of the bottom 56 of the landplane 38 is a guide element 57 having an aperture 58.

The link or loop 54 fits up into the guide element 57, and a hook 59 is adapted to pass through the loop 54 and into the aperture 58 of the guide element 57. The hook 59 is attached to an arm 60 which is pivoted at 61 to the interior of the airplane. Pivoted at 62 on the arm 60 is an operating cable 63 which passes forward to a control handle 64 in the cockpit of the airplane at a position accessible to the pilot. The control handle 64 is pivoted at 65. Means, not shown, are provided to hold the control handle 64 in position until the pilot desires to effect the release, at which time the control handle 64 is moved forward to pull on the cable 63, which rotates the arm 60 and removes the hook 59 from out of the loop 54. The loop 54 then falls out through the aperture 55 in the bottom 56 of the tail and the rear of the landplane is free. Simultaneously a cable 66 is also tensioned by the movement of the control handle 64. The cable 66 passes over pulleys 67 and 68, and pulls forward on a similar arm 60' to release a loop similar to the loop 54, which falls through the bottom of the airplane releasing the attachment of the airplane to the supporting hull 43 through a cable 51', similar in construction and function to the cable 51.

A similar locking device can be used to hold the airplane in place in the construction illustrated in Figure 9 if desired.

The airplane is thus simultaneously released at both of its points of attachment to the supporting hull, and can take off after the pilot rotates the rigid combination to a relatively high angle of attack attitude.

It is to be noted in this form of device just described, it is possible for the pilot to control the planing angle of the supporting boat in the same manner as the normal seaplane is controlled in planing. This cannot be done in the type of device where a freely pivoting cradle or support is employed.

The same general method of supporting and locking the landplane to the supporting boat can be used on airplanes having entirely different types of landing gears.

In the forms of construction shown, particularly in the forms illustrated in Figures 1 to 5 inclusive, and Figures 6 to 8 inclusive, the airplane is shown mounted a little further to the rear in the cradle than in actual practice. In general the center of gravity of the airplane is about one quarter chord distance from the leading edge of the wing in most constructions. It is generally desirable that the center of gravity of the airplane in the cradle be a little forward of the cradle pivot, so that at rest the airplane will overbalance the cradle, and the parts will rest in the position shown in Figures 1 and 6 with the cradle contacting the forward support element 4.

Airplane as used herein broadly includes land airplanes, seaplanes, flying boats, amphibians and any other heavier-than-air-aircraft. Body element and body unit as used herein broadly includes a land airplane fuselage, a flying boat airboat or amphibian hull, and the equivalent of a body in the case of a flying wing airplane having no external body. The supporting boat as herein described to support an airplane above the water to assist in takeoff, is variously referred to in the specification, as supporting boat, auxiliary boat, boat hull and pontoons, of which latter two are required.

We claim:

1. In a launching apparatus for the water launching of an airplane, a supporting boat, a pivoted cradle on the supporting boat on which the airplane is adapted to rest, a propelling boat, means linking the two boats, and propelling means in said propelling boat.

2. In a launching apparatus for the water launching of an airplane, a supporting boat having pontoons, a platform between the pontoons, a cradle pivoted on the platform, a propelling boat, means linking the two boats, and propelling means in said propelling boat.

3. Launching apparatus for launching a landplane from the water comprising a hull, a pivoted cradle on the hull, and outrigger supports from the cradle to the aft part of the landplane.

4. Launching apparatus for launching a landplane from the water comprising a hull, a pivoted cradle on the hull, outrigger supports from the cradle to the aft part of the landplane, and a chock device adapted to lie in front of the wheels of the landplane and carried by the cradle.

5. In a launching apparatus for the water launching of an airplane, a supporting boat, a cradle on which the airplane is adapted to rest, said cradle being pivoted to the supporting boat in a horizontal plane, a propelling boat, means linking the two boats, and propelling means in said propelling boat.

6. In a launching apparatus for the water launching of an airplane, a supporting boat, a pivoted cradle on the supporting boat on which the airplane is adapted to rest, a propelling boat at the rear of the supporting boat, means linking the two boats, and propelling means in the propelling boat.

7. In a launching apparatus for the water launching of an airplane, a supporting boat having pontoons, a platform between the pontoons, a cradle, said cradle being pivoted to the platform in a substantially horizontal plane, a propelling boat, means linking the two boats, and propelling means in said propelling boat.

8. In a launching apparatus for the water launching of an airplane, a supporting boat having pontoons, a platform between the pontoons, a cradle on which the airplane is adapted to rest, the cradle being pivoted to the platform in a substantially horizontal plane, a propelling boat, supporting arms attaching the propelling boat to the supporting boat, and propelling means in the propelling boat.

9. Launching apparatus for launching a landplane from the water comprising a hull, a cradle upon which the airplane is adapted to rest, said cradle being pivoted to the hull in a substantially horizontal plane, and outrigger supports extending from the rear portion of the cradle to the aft portion of the landplane.

10. Launching apparatus for launching a landplane from the water comprising a hull, a cradle upon which the landplane is adapted to rest, the cradle being pivoted to the hull in a substantially horizontal plane, outrigger supports extending from the rear of the cradle to the aft portion of the landplane, and a chock device adapted to lie in front of each wheel of the landplane and supported by the cradle.

REUBEN H. FLEET.
WILLIAM B. WHEATLEY.
ISAAC M. LADDON.